United States Patent
Fischer et al.

(10) Patent No.: US 9,092,618 B2
(45) Date of Patent: Jul. 28, 2015

(54) METHOD AND DEVICE FOR MAKING SECURE EXECUTION OF A COMPUTER PROGRAMME

(75) Inventors: Jean-Bernard Fischer, Le Kremlin Bicetre (FR); Paul Dischamp, Paris (FR)

(73) Assignee: OBERTHUR TECHNOLOGIES, Levallois-Perret (FR)

( * ) Notice: Subject to any disclaimer, the term of this patent is extended or adjusted under 35 U.S.C. 154(b) by 899 days.

(21) Appl. No.: 10/540,219

(22) PCT Filed: Dec. 10, 2003

(86) PCT No.: PCT/FR03/03658
§ 371 (c)(1),
(2), (4) Date: Jan. 17, 2006

(87) PCT Pub. No.: WO2004/066127
PCT Pub. Date: Aug. 5, 2004

(65) Prior Publication Data
US 2006/0156005 A1    Jul. 13, 2006

(30) Foreign Application Priority Data
Dec. 20, 2002    (FR) ..................... 02 16376

(51) Int. Cl.
| | |
|---|---|
| G06F 21/12 | (2013.01) |
| G06F 21/54 | (2013.01) |
| G06F 21/52 | (2013.01) |
| G06K 19/073 | (2006.01) |

(52) U.S. Cl.
CPC ............... *G06F 21/54* (2013.01); *G06F 21/52* (2013.01); *G06K 19/073* (2013.01); *G06K 19/07363* (2013.01)

(58) Field of Classification Search
USPC ........................................ 713/187; 717/127
See application file for complete search history.

(56) References Cited

U.S. PATENT DOCUMENTS

| | | | | |
|---|---|---|---|---|
| 5,721,894 A | * | 2/1998 | Doubtfire | .................. 712/240 |
| 5,944,817 A | * | 8/1999 | Hoyt et al. | .................. 712/240 |
| 5,974,529 A | | 10/1999 | Zumkehr et al. | |

(Continued)

FOREIGN PATENT DOCUMENTS

| | | |
|---|---|---|
| EP | 1056012 | 11/2000 |
| WO | WO 00/54155 | 9/2000 |
| WO | WO 01/97010 | 12/2001 |

OTHER PUBLICATIONS

Chen et al., Oblivious Hashing: A Steathly Software Integrity Verficiation Primitive, 2002, Revised Papers from the 5th International Workshop on Information Hiding table of contents, Lecture Notes in Computer Science; vol. 2578 archive, pp. 400-414.*

*Primary Examiner* — Michael R Vaughan
(74) *Attorney, Agent, or Firm* — Young & Thompson

(57) ABSTRACT

A method for making secure execution of a computer program includes a set of at least one instruction, characterized in that it includes: a first step which consists in calculating and storing, prior to execution of the computer program, a first signature representing the expected execution of the set of instructions; a second step which consists in calculating and storing, during execution of the set of instructions, a second signature representing the execution of the set of instructions; and a step which consists in detecting an anomaly of execution of the set of instructions from the first and second signatures.

38 Claims, 2 Drawing Sheets

(56) References Cited

U.S. PATENT DOCUMENTS

Figure 1:
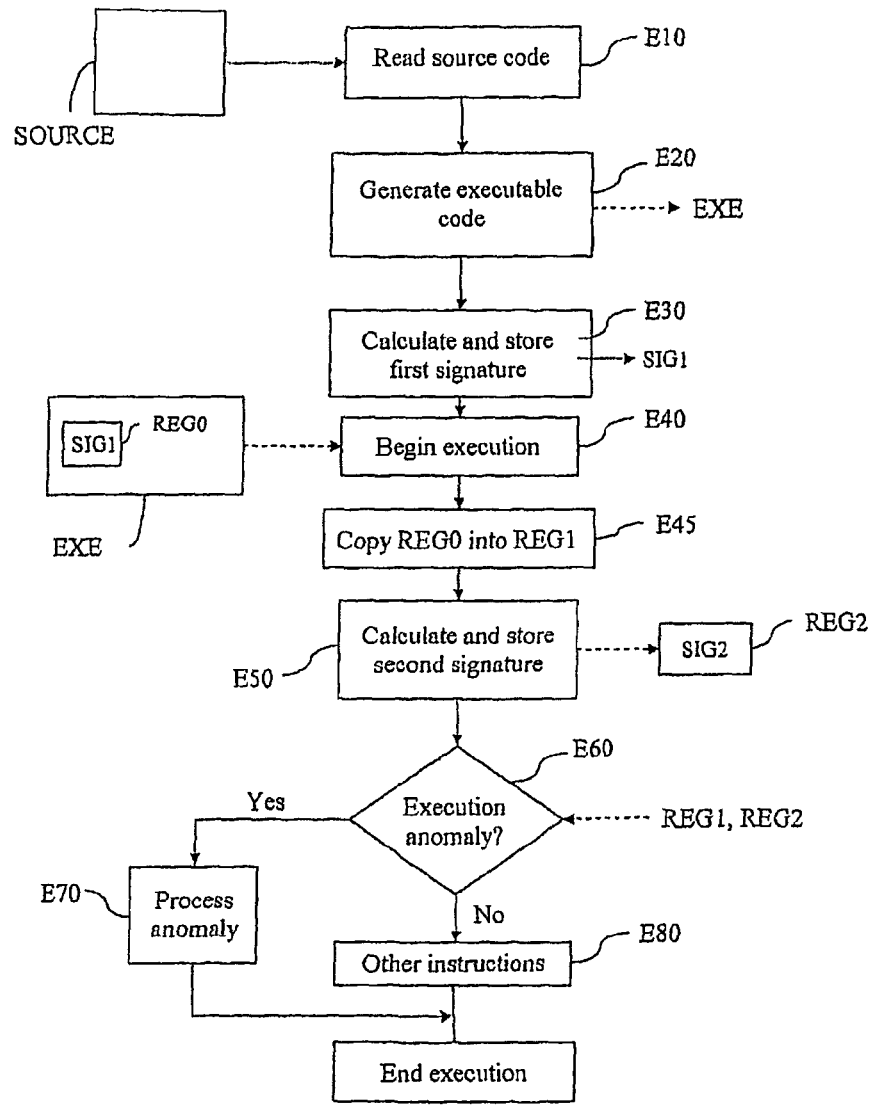

| | | | |
|---|---|---|---|
| 5,983,348 A * | 11/1999 | Ji | 726/13 |
| 6,839,849 B1 * | 1/2005 | Ugon et al. | 726/20 |
| 7,086,088 B2 * | 8/2006 | Narayanan | 726/22 |
| 7,155,704 B2 * | 12/2006 | Williams | 717/127 |
| 7,168,065 B1 * | 1/2007 | Naccache et al. | 717/127 |
| 7,228,426 B2 * | 6/2007 | Sinha et al. | 713/176 |
| 7,237,145 B2 * | 6/2007 | Sun et al. | 714/15 |
| 7,330,978 B1 * | 2/2008 | Harrington et al. | 713/191 |
| 7,406,603 B1 * | 7/2008 | MacKay et al. | 713/193 |
| 7,539,868 B2 * | 5/2009 | Balard et al. | 713/176 |
| 8,001,388 B2 * | 8/2011 | Home et al. | 713/187 |
| 2002/0194579 A1 * | 12/2002 | Dollin et al. | 717/126 |
| 2003/0126454 A1 * | 7/2003 | Glew et al. | 713/193 |
| 2003/0229777 A1 * | 12/2003 | Morais et al. | 713/2 |
| 2004/0044906 A1 * | 3/2004 | England et al. | 713/200 |
| 2004/0133777 A1 * | 7/2004 | Kiriansky et al. | 713/166 |
| 2004/0162989 A1 * | 8/2004 | Kirovski | 713/189 |
| 2004/0210885 A1 * | 10/2004 | Wang et al. | 717/158 |
| 2004/0255132 A1 * | 12/2004 | Venkatesan et al. | 713/190 |
| 2005/0010804 A1 * | 1/2005 | Bruening et al. | 713/200 |
| 2005/0033982 A1 * | 2/2005 | Paaske | 713/200 |
| 2006/0294370 A1 * | 12/2006 | Greenspan | 713/164 |
| 2007/0198851 A1 * | 8/2007 | Goto | 713/187 |

\* cited by examiner

METHOD AND DEVICE FOR MAKING SECURE EXECUTION OF A COMPUTER PROGRAMME

The present invention relates to a method and device for making the execution of a computer program secure.

It also relates to a device for processing a computer program that can be made secure by means of a method or a device conforming to the present invention.

The securing method and device of the invention may in particular, but in a non-limiting manner, be used to make secure the execution of a program in a microcircuit card.

In the remainder of this document, "making secure" a computer program means:
- detecting malicious attacks seeking to modify the normal behavior of a computer program, and
- making the execution of a computer program reliable, in particular the execution of a program that is executed in an environment subject to high levels of interference (such as a satellite) or a program that has strict requirements in terms of reliability, for example a program controlling a cardiac implant.

The present invention can in particular detect an attack intended to modify the execution of a computer program executed in a microcircuit card.

In particular it can detect attacks by interference with the operation of the microcircuit card often referred to as differential fault analysis (DFA) attacks.

Such attacks aim to modify illicitly the content of a register, memory or bus or to oblige a processor not to execute certain instructions of the program. In this case, the attacked computer program may be executed in a very different way from that in which it was designed to be executed.

Among others, they may, in known manner, be made by:
- generating a voltage spike at one of the power supply terminals of the processor,
- suddenly increasing its temperature,
- quickly changing its clock frequency or its power supply voltage,
- applying a flash of light or a laser beam to a portion of the silicon constituting it.

According to the state of the art, the person skilled in the art has various ways to combat DFA attacks.

In particular, most microcircuit card components include sensors that detect such attacks. But their efficiency is limited because it is impossible in practice to provide sensors over the whole of the surface of the component.

Moreover these sensors are likewise made of silicon, it is possible to interfere with them or to modify the information that they transmit.

Furthermore, the document WO 00/65442 discloses a known mechanism for protecting the core of a processor against external manipulation.

This document describes a method of making a computer program secure in which, during the execution of a first instruction, a first value is calculated from the content of the registers of the processor, after which a second value is calculated in accordance with the same principle just before the immediately next instruction is executed.

By comparing these two values, this method can detect any attack that might have been committed during the time interval between the end of the first instruction and the beginning of the next execution, i.e. during a time of inactivity of the processor.

The above securing method has two drawbacks, however:

Firstly, it cannot detect an attack during the execution of an instruction or while loading the code of an instruction into a calculation register of the processor (FETCH instruction).

This is because, if the registers of the processor remain unchanged between two consecutive instructions, the above method will not detect an anomaly, even if the registers contain an illicit value caused, for example, by an attack during the first instruction, just before the first value is calculated.

Secondly, the result of calculating the first value being unknown a priori, the above method requires that a potential attack after an instruction be detected before the execution of the next instruction, since the execution of the next instruction would necessarily modify the value of the registers of the processor and thus the value.

Thus only an attack occurring between two instructions can be detected, and not unintended execution of the program, for example an illicit jump.

In particular, there is no provision for storing the history of the instructions executed before a sensitive instruction, i.e. an instruction which if attacked would compromise security, for example instructions to compare secret data during the verification of a PIN. This drawback is particularly problematical because it prevents defense against an attack by interfering with the processor, for example of DFA type, which would force the processor to execute the sensitive instruction without executing the intended preceding instructions.

To be more precise, a first aspect of the present invention relates to a method of making secure the execution of a computer program including a set of instructions comprising at least one instruction.

In the remainder of this document, the term "signature" refers to any information representative of predetermined operations effected by a processor during the execution of a set of instructions.

The securing method of the invention is characterized in that it comprises:
- a first step, prior to the execution of the computer program, of calculating and storing a first signature representative of the intended execution of the set of instructions,
- a second step, during the execution of the set of instructions, of calculating and storing a second signature representative of the execution of the set of instructions, and
- a step of detecting an anomaly in the execution of the set of instructions on the basis of the first signature and the second signature.

The first calculation and storage step is preferably executed during the generation of the instructions of the computer program.

For example, the first calculation and storage step may be effected on the basis of the assembler code of the instructions of the computer program or on the basis of the compiled code or the executable code of this program.

Thus according to this first aspect of the invention, the first signature is calculated and stored at the time of generating the computer program. The value of this first signature, representative of normal execution of the program, is therefore known.

During execution of the program, a second signature is calculated that is representative of the real execution of the instructions of the program. This second signature is also stored.

It is therefore possible, thanks to the invention, to detect an attack occurring during the execution of an instruction of the program or while loading the code of that instruction into a calculation register of the processor (FETCH instruction).

In this event, the second signature would be different from the first.

In a preferred first variant of the securing method of the storing of the invention, the second signature is retained in memory during the execution of at least one second instruction following the set of instructions.

Thus the execution anomaly can be detected subsequently, including after the execution of several instructions after the set of instructions.

This has the great advantage that the history of the instructions executed before a sensitive instruction can be stored, so that attacks can be detected that aim to oblige the processor to avoid the execution of a given set of instructions.

This embodiment also has the advantage of detecting an attack at any time during the execution of the program, which makes it very difficult to mount an attack on the detection process as such.

In a first preferred embodiment, the first and second signatures are obtained from the number of instructions in the set of instructions.

According to this first preferred embodiment, the securing method can detect an unintended jump in the execution of the computer program.

In a first example of this first preferred embodiment, the first signature is the number of instructions in the set of instructions, the second signature is the number of instructions from the set of instructions that have been executed at a given time, and the detection step detects an execution anomaly when the first and second signatures are different after the execution of the set of instructions.

In a variant of this first example of this first preferred embodiment, the detection step detects an anomaly only when the value of the second signature is less than that of the first signature. This has the advantage of detecting an anomaly only in the situation where a minimum number of instructions have not been executed.

In a second example of this first preferred embodiment, the first and second signatures are respectively the number of instructions in the set of instructions and the arguments of those instructions.

In a third example of this first preferred embodiment, the second signature is obtained from the number of instructions from the set of instructions that have not been executed.

This second signature can be obtained by subtracting from the first signature stored during the first calculation and storage step the number of instructions already executed by the processor. In this variant, the detection step detects an anomaly when the value of the second signature is not zero after the execution of the set of instructions.

According to a fourth example of this first preferred embodiment, the first signature is equal to the number of instructions in the set of instructions plus the number of arguments of those instructions and the second signature is equal to the number of instructions already executed plus the number of arguments of those instructions.

In these third and fourth examples of the first preferred embodiment of the invention, an instruction of the computer program is advantageously triggered when the value of the second signature is below a predetermined threshold.

In this way it is possible to detect unintended execution of the computer program if the step of detection as such is rendered ineffective by virtue of an attack aimed at the detection step itself.

In a preferred version of the third and fourth examples of the first embodiment, the first and second signatures are held in memory in the same register during the execution of the program.

This embodiment is advantageous as it saves one storage register.

In a second preferred embodiment:
the first signature is obtained from the code of a critical instruction of the set of instructions,
the second signature is obtained from the code of the critical instruction, that code being stored at the same time as or after the execution of that critical instruction, and
the detection step detects an execution anomaly when the first and second signatures are different after the execution of the set of instructions.

In practice, this instruction code is preferably the machine code of the instruction recognized by the processor.

As a variant, the signatures may, for example, consist of the instruction code and its arguments.

This second preferred embodiment can verify that the critical instruction has actually been executed during the execution of the computer program.

In a third preferred embodiment:
the first signature is obtained from the address of a critical instruction of the set of instructions, that address being obtained during or after the generation of the executable code of the set of instructions,
the second signature is obtained from the address of that critical instruction, that address being stored at the same time as or after the execution of that critical instruction, and
the detection step detects an execution anomaly when the first and second signatures are different after the execution of the set of instructions.

In this third preferred embodiment, the first and second signatures can, for example, consist of the address of the instruction as such to which can be appended the address of an argument of that instruction.

This third preferred embodiment can also verify that the critical instruction has been executed.

In this third embodiment, the critical instruction can be a jump instruction, for example the assembler language instruction JMP, JNZ, CJNE or JZ.

It is therefore possible to verify that the instructions being executed are not executed after an attack on a jump instruction.

According to a fourth preferred embodiment:
the first and second signatures are error detector codes calculated from the code or from an address of at least one instruction of the set of instructions, and
the detection step detects an execution anomaly when the first signature and the second signature are different after the execution of the set of instructions.

This preferred embodiment is particularly advantageous when it is required to verify that several instructions from the instructions set have been executed, in particular instructions that need not be consecutive in that set.

In another embodiment the error detector codes are obtained by logically combining instruction codes, for example by means of an exclusive-OR (XOR) logic operator.

In preferred manner, the above error detector codes are cyclic redundancy check (CRC) codes, which are particularly easy to implement and fast to execute.

In a fifth preferred embodiment, the first and second signatures are respectively obtained during generation and execution of said instructions from at least two elements chosen from:
the number of instructions of the set of instructions,
the code of at least one instruction of said set of instructions,
the address of at least one instruction of said set of instructions, and an error detector code calculated from the code or the address of at least one critical instruction of said set of instructions, the address being obtained during or after the generation of the executable code of the set of instructions.

In this preferred embodiment, the detection step detects an execution anomaly when the first signature and the second signature are different after the execution of said set of instructions.

Thus the first and second signatures of this fifth embodiment combine the advantages of the signatures described briefly hereinabove with reference to the first four embodiments.

In another preferred embodiment, the securing method further comprises a step of destroying at least a portion of the system on which the computer program executes, this destruction step being executed when the detection step detects an execution anomaly.

This embodiment is particularly advantageous for protecting a card against attacks that interfere with its microcircuit, which are known not to enable a particular instruction to be targeted easily, at least on the first attempt.

In this variant embodiment, the destruction step may, for example, destroy the operating system of the microcircuit card; the microcircuit card then becomes unusable after detection of an attack.

In a preferred variant, the first signature is generated automatically, for example by a software engineering tool.

This feature has the advantage that it simplifies the work of the developers of the computer program to be made secure.

In a second aspect, the present invention provides a device for processing a computer program including a set of at least one instruction, characterized in that it includes means for calculating and storing a first signature representative of the intended execution of said set of instructions prior to said execution thereof.

This processing device automatically generates the first signature of the computer program.

It may in particular be adapted to calculate and store a first signature consisting of an element or a combination of elements obtained from:
  the number of instructions in the set of instructions,
  the code or the address of a critical instruction of the set of instructions, or
  an error detector code calculated from the code or an address of at least one instruction from the set of instructions, which error detector code may be a cyclic redundancy check code.

According to another aspect, the present invention provides a device for making secure the execution of a computer program including a set of at least one instruction. This device includes:
  a first register for storing a first signature representative of the intended execution of the set of instructions,
  means for calculating and storing in a second storage register during the execution of the set of instructions a second signature representative of the execution of the set of instructions, and
  means for detecting an anomaly in the execution of the set of instructions on the basis of the first and second signatures.

The invention also provides a microchip card incorporating a securing device as briefly described hereinabove.

The advantages of the processing device, the securing device and the microchip card of the invention being identical to those of the securing method, they are not explained again here.

Figure 2:
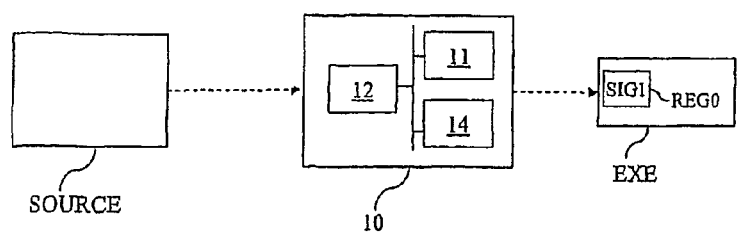
Figure 3:
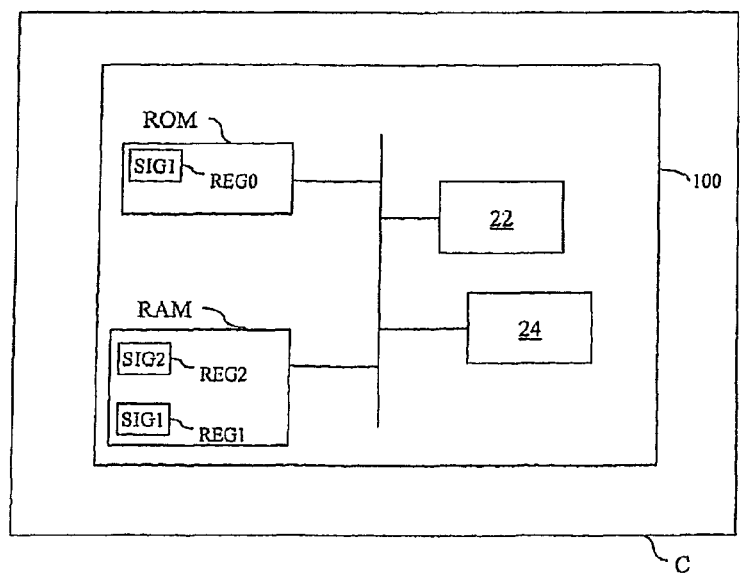

The invention will be better understood and other advantages of the invention will become more clearly apparent in the light of the following description of a securing method and device and a processing device of a computer program according to the invention, the description being given by way of example only and with reference to the appended drawings, in which:

FIG. 1 represents the main steps of one particular embodiment of a method according to the invention of making the execution of a computer program secure, FIG. 2 is a diagram of one particular embodiment of a device of the present invention for processing a computer program, and FIG. 3 represents one preferred embodiment of a device according to the invention for making a computer program secure.

The description is accompanied by appendices A to D giving four examples of computer programs in assembler language made secure in accordance with the invention.

Appendix A represents the assembler code of a program A. The assembler code comprises 13 instructions denoted A1 to A13.

During the instruction A1, the value 101 is stored in a register opcode_count.

The instruction A1 is followed by an instruction A2 during which the bit opcode_start is initialized to the value 1, which triggers automatic decrementing of the register opcode_count when each new instruction is executed.

The instruction A2 is followed by three instructions A3, A4, A5 during which the value message1 is stored in the register r0, the value message2 is stored in the register r1 and the value 16 is stored in the register r2, respectively.

The instruction A5 is then followed by a loop "loop_round_i" consisting of the instructions A6 to A11.

To be more precise, during the instruction A6, there is stored in a register a the item of data to which the address in the register r1 points. The instruction A6 is followed by an instruction A7 during which the exclusive-OR logic operation (XOR) is applied to the content of the register a and the item of data to which the address in the register r0 points.

The instruction A7 is followed by an instruction A8 during which the content of the register a is substituted for the item of data to which the address in the register r0 points.

The instruction A8 is followed by two instructions A9 and A10 during which the contents of the registers r0 and r1, respectively, are incremented by one unit.

The instruction A10 is followed by an instruction A11 during which the content of the register r2 is decremented by one unit and a test is executed to determine if the decremented content of the register r2 is zero. If not, the instruction A11 is followed by the instruction A6 described above.

The content of the register r2 having been initialized to the value 16 during the instruction A5, the loop "loop_round_i" is executed sixteen times.

On the other hand, when the content of the register r2 is zero, the instruction A11 is followed by the instruction A12 during which the content of the bit opcode_start is changed to 0, which interrupts automatic decrementing of the counter opcode_count.

The instruction A12 is followed by an instruction A13 during which the content of the register opcode_count is decremented, after which the content of the register is tested.

When the content of that register is not zero, the program calls a routine "error_on_opcode_count" for processing execution anomalies.

Setting the value of the bit opcode_start to 1 during the instruction A2 automatically triggers the counter opcode_count, which is automatically decremented by one unit as each instruction is executed.

In practice, the processor executing the computer program includes means adapted to decrement this counter on each loading of the code of an operation (FETCH instruction).

This counter is stopped by setting the bit opcode_start to 0 during the instruction A12.

Execution of this computer program A is made secure in accordance with the invention. In fact:

During the generation of this program, not described here, a first signature of value 101 is calculated and stored, this first signature being representative of the number of instructions that the program A should normally execute when the bit opcode_start is set to 1, i.e. between the instructions A3 and A12.

If the program executes normally, the instructions executed between the instructions A3 and A12 are:
- the instructions A3, A4 and A5, which are executed once,
- the instructions A6, A7, A8, A9, A10, A11, which are executed 16 times, and
- the instruction A12, which is executed once.

The total number of instructions is therefore (3×1)+(16×6)+(1×1)=100.

Following the instruction A12, the register opcode_start therefore contains the value 1 (101-100) if the program has executed normally.

During the instruction A13, the register opcode_count is decremented. The register opcode_count should therefore normally contain the value 0. If not, this means either that not all the instructions of the program have been executed or that unintended instructions have been executed.

According to the present invention, the value 101 stored in the register opcode_count during the instruction A1 is a first signature representative of the execution of the set of instructions A2 to A13 calculated, for example, by the programmer or automatically at the time of generating this set of instructions.

In the same way, and still in accordance with the present invention, during the execution of the program the register opcode_count is decremented on the execution of each instruction. It therefore stores a second signature equal to the number of instructions that have not been executed as intended, this second signature being calculated as a difference with respect to the first signature 101.

The instruction A13 constitutes a step of detecting an execution anomaly which verifies if the content of the register opcode_count is zero after decrementing that register. If the value of this register is not zero, this means that either at least one of the intended instructions has not been executed or an unintended instruction has been executed, this constituting an anomaly in either case.

In a preferred embodiment, a software interrupt is triggered when the count becomes negative. This advantageously enables the detection of an attack whose effect would be not to execute the detection instruction A13 and the instruction A12 for stopping the counter.

In this embodiment, the instruction A12 for stopping the counter and the detection instruction A13 may be combined into a single instruction added to the instruction set of the processor. It is then even more difficult to mount an attack consisting in stopping the counter and skipping the detection instruction.

Appendix B represents the assembly code of another program B.

In this embodiment, the processor that executes the program B includes a register SFR_OPH that contains the operation code of the last instruction executed.

During a first instruction B1, the exclusive-OR logic operation (XRL) is applied to the content of a register A and to the content of a register R1 of the processor.

The instruction B1 is followed by an instruction B2 during which the program branches to the label "result_false" if the contents of the registers A and R1 are different.

When the contents of the registers A and R1 are equal, the instruction B2 is followed by an instruction B3 during which the content of the register SFR_OPH, i.e. the operation code of the last instruction executed (B2) before the instruction currently being executed (B3), is stored in the register R5.

Accordingly, following the instruction B3, the register R5 contains the code of the instruction JNZ (70h).

The instruction B3 is then followed by three instructions B4 to B6 during which, respectively, the value from the register R7 is stored in the register A, the logic OR operation is applied to the content of the register A and the hexadecimal value 55h, and the new content of the value A is stored in the register R7.

The instruction B6 is followed by an instruction B7 during which the content of the register R5 is stored in the register A. As explained above, the register A contains the code 70h of the operation JNZ if the instruction B2 was executed before the instruction B3.

The instruction B7 is followed by an instruction B8 during which the exclusive-OR logic operation is applied to the content of the register A and the value 70h of the code of the instruction JNZ.

Accordingly, if the test in the instruction B2 has been executed, the result of the exclusive-OR operation applied to the instruction B8 is equal to 0.

If not, the instruction B9 following the instruction B8 causes the program B to branch to a routine "os_kill_card" for destroying the operating system of the microcircuit card.

Thus, using the securing method according to the invention, the program can verify that the critical instruction B2 has actually been executed.

To this end, during the generation of the computer program, a first signature representative of the execution of the instruction B2, namely the code 70h of the instruction JNZ is calculated and stored in a register of the ROM containing the executable code of the program B, that register being associated with the instruction B8.

During execution of the instruction B3, a second signature is stored by loading into the register R5 the instruction code preceding the instruction B3, which is normally the code 70h if there has been no attack.

The step B9 is an execution anomaly detection step, an anomaly being detected if the first signature and the second signature are different.

The method described above with reference to appendix B can therefore detect that the instruction B2 has actually been executed.

Appendix C represents the assembler code of another program C.

In known manner, each instruction of the program C includes the address of that instruction in the first column.

For example, the address of the instruction C1 is 0x8500.

In this embodiment, the processor that executes the program C includes a register SFR_JMP that stores the address of the last instruction that executed a jump (JMP, JNZ, CJNE, etc.).

During the first instruction C1, the exclusive-OR logic operation (XRL) is applied to the content of the register A and that of the register R1.

The instruction C1 is followed by an instruction C2 during which a jump to the "continue" label is executed if the result of the preceding instruction C1 has a value other than 0.

Thus the computer program C branches to the "continue" label if the values of the registers A and R1 are different.

During the instruction C2, and in accordance with the present invention, the processor automatically stores the address 0x8501 of the jump instruction JNZ (C2) in the predetermined register SFR_JMP, comprising an upper part SFR_JMPH and a lower portion SFR_JMPL.

When the program branches to the "continue" label, it first executes two instructions C4 and C5 respectively during which it stores the value 25 in the register A and adds the value 34 to the content of the register A.

Following the instruction C5, it then executes an instruction C6 that terminates execution of the computer program C.

On the other hand, when the result of applying the exclusive-OR logic operation executed in the instruction C1 is zero, i.e. when the contents of the registers A and R1 are equal, the conditional jump instruction C2 has no effect. This instruction C2 is then followed by an instruction C3 to jump to the "secret_code" label.

According to the present invention, during execution of the instruction C3, the processor stores the value 0x8503 of the address of the instruction C3 automatically in the register SFR_JMP.

When the computer program C branches to the "secret_code" label, it first executes two instructions C7 and C8 during which it stores in the registers A and R5 the content of the upper portion SFR_JMPH and the lower portion SFR_JMPL of the content of the register SFR_JMP, respectively.

Normally, if the instruction C7 is executed after the instruction C3, the registers A and R5 should respectively contain the values 85 and 03, corresponding to the upper and lower portions of the address 0x8503.

The instruction C8 is then followed by two instructions C9 and C10 which verify if the contents of the registers A and R5 are equal to 85H and 03H, respectively.

If not, the computer program executes an "os_kill_card" routine to destroy the operating system of the computer program.

When the contents of the registers A and R5 are equal to 85H and 03H, respectively, the instruction C10 is followed by an instruction C11 during which the secret code (PIN) is stored in the register A.

The instruction C11 is followed by an instruction C12 for terminating execution of the program C.

Thus, for example, in accordance with the present invention, the first signatures consisting of the values 85H and 03H constituting the address of the instruction C3 are calculated and stored during the generation of the computer program.

Then, during execution of the instructions C7 and C8, a second signature is stored by loading into the registers A and R5 the content of the register SFR_JMP, which should contain the value 0x8503 if the program C has been executed normally.

In accordance with the present invention, the instructions C9 and C10 constitute steps of detecting an execution anomaly by comparing the content of the registers A and R5, that is to say the second signature, with the first signature stored at the time of generating the program, namely the address of the instruction C3.

The securing method described here verifies that when the program branches to the instruction C7 it has previously executed the instruction C3, which means that the application of the exclusive-OR logic operation in the instruction C1 yielded a zero value, and thus that the registers A and R1 contain an identical value.

The securing program therefore verifies that, on entering the sub-portion of the program identified by the "secret_code" label, these instructions are executed legally, i.e. not after an attack, in which case the value in the register SFR_JMP would be different from the value 0x8503 corresponding to the address of the instruction C3.

In another embodiment that is not described here, the program C includes other instructions, similar to the instructions C9 and C10, including instead of the values 85H and 03H the lower and upper portions of the addresses of other jump instructions, enabling a program including a plurality of instruction jumps to be made secure by the principle described above.

Appendix D represents the assembly code of another computer program D. To facilitate the description, the instructions of the lines D2 to D12 include, in the first column, the hexadecimal code of the corresponding instruction.

For example, the code of the instruction "mov r0,# message1" is the value 78h.

During the first instruction D1, the bit chk_opcode_start is initialized to the value 1.

The instruction D1 is followed by three instructions D2, D3, D4 during which the value message1 is stored in the register r0, the value message2 is stored in the register r1 and the value 16 is stored in the register r2, respectively.

The instruction D4 is then followed by a loop "loop_round_i" consisting of the instructions D5 to D10.

To be more precise, during the instruction D5, the item of data to which the address contained in the register r1 points is stored in a register.

The instruction D5 is followed by an instruction D6 during which the exclusive-OR logic operation (XRL) is applied to the content of the register a and the item of data to which the address contained in the register r0 points.

The instruction D6 is followed by an instruction D7 during which the item of data to which the address contained in the register r0 points is replaced by the content of the register a.

The instruction D7 is followed by two instructions D8 and D9 during which the contents of the registers r0 and r1, respectively, are incremented by one unit.

The instruction D9 is followed by an instruction D10 during which the content of the register r2 is decremented by one unit and a test is performed to determine if the decremented content of the register r2 is zero. If not, the instruction D10 is followed by the instruction D5 described above.

The content of the register r2 having been initialized to the value 16 in the instruction D4, the loop "loop_round_i" is executed 16 times.

On the other hand, when the content of the register r2 is zero, the instruction D10 is followed by an instruction D11 during which the content of a "checksum" register is stored in the register a.

According to the invention, this "checksum" register holds an error detector code calculated from the code of the instructions D2 to D11.

In fact, in the present embodiment, after the chk_opcode_start bit is initialized to the value 1 during the instruction D1, the processor applies the exclusive-OR logic operation to the code of the subsequent instructions and stores the result of this operation in the "checksum" register.

Accordingly, after execution of the instruction D2, the content of the "checksum" register is equal to 78h.

Similarly, after execution of the instruction D3, the content of the "checksum" register is equal to the result of applying the exclusive-OR logic operation to the values 78h and 79h, which is 01.

Accordingly, following the loop consisting of the operations D5 to D10, the "checksum" register contains a signature representative of the instructions that have been executed after the execution of the instruction D1.

If the instructions D2, D3, D4 have been executed once and the instructions D5 to D10 have been executed 16 times, the content of the "checksum" register after the last execution of the instruction D10 is equal to 7Bh.

The instruction D11 is followed by an instruction D12 during which the content of the register a is compared with the hexadecimal value 0Fh.

According to the terms of the present invention, this value 0Fh constitutes a first signature calculated and stored in a register of the memory containing the program D, this first signature being representative of the expected execution of the instructions D2 to D11.

During the instruction D12, if the content of the register a is other than the value 0Fh, the program D calls a routine "kill_card" for processing execution anomalies.

Thus this instruction D12 constitutes a step of detecting an anomaly in the execution of the instructions D2 to D11 on the basis of the first signature 0Fh and the second signature stored in the "checksum" register.

In the preferred embodiment described here, the "kill_card" processing routine renders use of the microcircuit card impossible.

FIG. 1 represents the main steps E10 to E80 of a preferred embodiment of the securing method of the present invention.

In the present example, the securing method makes secure the execution of a computer program EXE whose source code SOURCE is written in assembler language.

This source code is similar to that described above with reference to appendices A to D, for example.

The securing method of the invention includes two series of steps, namely a first series comprising steps E10 to E30 of generating the executable code of the program from the source code SOURCE and a second series of steps E40 to E80 of executing the computer program EXE.

During the first step E10 of the securing method of the invention, the source code SOURCE of the program to be secured is read.

This step of reading source code is known to the person skilled in the art. It may be executed by an assembler or a compiler.

The step E10 of reading the source code is followed by a step E20 during which the executable code EXE of the computer program is generated.

This step is known to the person skilled in the art. It may in particular be executed by a compiler.

The step E20 of generating the executable code EXE is followed by a step E30 of calculating and storing a first signature SIG1 representative of the expected execution of a set of instructions of the computer program to be made secure.

In the present embodiment described here, this first signature SIG1 is stored in a register REG0 of the read-only memory ROM containing the executable computer program EXE.

In a different variant embodiment, the step E30 of calculating and storing a first signature SIG1 is effected during the step E10 of reading the source code.

In another variant embodiment, the step E30 of calculating and storing a first signature SIG1 is effected during the step E20 of generating the executable code. This is, in particular, the case when the first signature is obtained from the address of a critical instruction of the computer program.

This first calculation and storage step E30 may be executed in different ways.

In a first variant, the first signature SIG1 is the number of instructions whose execution is to be made secure. Such a variant is described above with reference to appendix A.

To be more precise, if the programming language of the computer program is the assembler language, this step consists in counting the number of operation codes of the instructions of the set of instructions to be made secure.

In the variant in which the programming language is a high-level language, such as C, this step consists firstly in generating an assembler program from the high-level source code and then counting the number of assembler language instructions generated in this way.

Software engineering tools, and in particular the graphical user interface of these tools, that enable a programmer to introduce into the computer program the instructions necessary for implementing the securing method according to the invention are described hereinafter with reference to FIG. 2.

In the example described above with reference to appendix A, the first signature is the number 101 stored in a register REG0 of the memory containing the executable code of the program A.

In another variant embodiment described above with reference to appendix B, the first signature is the code of a critical instruction of the set of instructions.

Accordingly, in the program B described above, the first signature is the code 70h of the instruction JNZ. This first signature is stored in a register REG0 of the memory of the executable program B.

In another embodiment, as described above with reference to appendix C, the first signature is the address of a critical instruction of the set of instructions, obtained during or after generation of the executable code of the set of instructions.

In the example described above with reference to appendix C, the first signature is the value 0x8503 corresponding to the address of the instruction C3, which is stored in memory registers associated with the instructions C9 and C10 of the memory containing the executable code of the program C.

In another preferred embodiment described with reference to appendix D, the first signature is an error detector code calculated from the code of at least one instruction of the set of instructions to be made secure.

That signature may, for example, be a logical combination of the codes of instructions to be made secure.

In a preferred embodiment of this variant, this first signature may be a cyclic redundancy check code obtained from the instruction codes or by logically combining (XOR) these instruction codes.

The step E30 is followed by step E40 during which execution of the computer program EXE begins.

In the present embodiment, the computer program EXE is stored in a read-only memory ROM in which a register REG0 contains the first signature SIG1 calculated in the step E20.

The step E40 of beginning execution of the computer program is followed by a step E45 during which the content SIG1 of the register REG0 of the read-only memory ROM is copied into a register REG1 of the random-access memory RAM used by the computer program EXE.

The copying step E45 is followed by a step E50 during which a second signature SIG2 representative of execution of the set of instructions to be made secure is calculated and stored in a register REG2 of the random-access memory RAM.

The second signature is calculated during execution of the set of instructions.

It consists, for example, of the number of instructions that have been executed at a given time or the number of instructions remaining to be executed, as described above with reference to appendix A.

As described with reference to appendix B, it may instead be the code of an instruction that has just been executed or, as described above with reference to appendix C, the address of that instruction.

In the embodiment in which the first signature SIG1 is an error detector code calculated from the code of an instruction from the set of instructions, the step E50 of calculating and storing the second signature SIG2 is executed by calculating the error detector code as and when the instructions concerned are executed.

As indicated above with reference to appendix D, this may in particular be a cyclic redundancy check code or a logical combination (for example XOR).

Be this as it may, the step E50 of calculating and storing a second signature SIG2 enables that second signature to be stored in a register REG2 of the random-access memory RAM in which the computer program EXE is executed.

The content of the register REG2 is preferably retained during execution of at least a second instruction following the set of instructions to be made secure.

The step E50 of calculating and storing a second signature SIG2 is followed by a test E60 for detecting an anomaly in the execution of the set of instructions on the basis of the first and second signatures SIG1, SIG2 respectively.

According to the invention, any number of instructions can be executed between the step E50 and the test E60.

This test E60 for detecting an anomaly consists in verifying if the value of the second signature SIG2 matches the value of the first signature SIG1 calculated and stored during generation of the computer program, which would mean that the instructions to be made secure have been executed as intended.

When the second signature SIG2 does not match the first signature SIG1, this means that the computer program EXE has not been executed as intended, for example following a DFA attack.

The test E60 for detecting an execution anomaly may in particular consist in comparing the signatures SIG1 and SIG2 when those signatures are:
  the number of intended instructions (SIG1) and the number of instructions actually executed (SIG2),
  the code SIG1 of an intended critical instruction and the code SIG2 of an instruction actually executed,
  the address SIG1 of an intended critical instruction and the address SIG2 of an instruction actually executed, and
  an error detector code CRC1, for example a cyclic redundancy check code calculated from the operation codes of a certain number of instructions and the error detector code CRC2, for example a cyclic redundancy check code calculated from a set of instructions actually executed.

In the preferred embodiment described above with reference to appendix A, the step E60 of detecting an execution error consists in comparing the number of instructions remaining to be executed with the value zero.

Be this as it may, if an execution anomaly is detected during the test of the detection E60, that test is followed by a step E70 of processing this anomaly.

The step E70 may in particular consist in a step of destroying a portion of the data processing system in which the computer program is executed, for example the destruction of the operating system, which renders the microcircuit card unusable in the event of detection of a malicious attack.

As a variant, the processing step E70 is implemented only when a plurality of anomalies are detected during separate uses of the card. A register is used for this purpose in which the number of anomalies is accumulated, possibly as a function of their nature.

As a variant, the processing step E70 consists in resetting the data processing system in which the computer program is executed, for example by means of a reset command.

In another variant embodiment, the step E70 of processing an anomaly may simply consist in sending a information message intended for the user of the device.

This variant embodiment is particularly beneficial when the securing method of the invention is used to make the execution of a computer program more reliable (satellite, control of a cardiac implant).

The step E70 terminates the securing method of the present invention described here.

Moreover, when no anomaly is detected during the step E60 of detecting an execution anomaly, the test E60 is followed by a step E80 in which other, non-secured instructions may be executed.

The securing method of the present invention terminates at the end of the step E80.

FIG. 2 is a diagram of a preferred embodiment of a device of the present invention for processing a computer program.

In a preferred embodiment, the processing device 10 includes means 11 for editing the computer program SOURCE.

The editing means 11 include in particular selection means, for example a keyboard, a mouse and a word processor, for selecting the instructions in the computer program SOURCE to be secured.

The editing means 11 are also used to insert automatically or manually into the computer program SOURCE particular instructions for calculating and storing the second signature SIG2 that is calculated during the execution of instructions to be made secure.

The editing means 11 are also used to insert into the computer program SOURCE an instruction for implementing the anomaly detection step.

The device 10 for processing a computer program includes means 12 for calculating and storing, during the generation of the instructions, a first signature SIG1 representative of the intended execution of the set of instructions selected by the selection means 11.

In known manner, the calculation and storage means 12 are adapted to read the computer program SOURCE, in particular to read a computer program like those of appendices A to D.

In a preferred embodiment, the processing device 10 includes means 14 for generating executable code from the source computer program.

The means 14 for generating executable code are in particular adapted to obtain and store the addresses of the critical instructions to be made secure in the executable code of the computer program SOURCE.

In a preferred embodiment, the calculation and storage means 12 are adapted to count the number of instructions selected by the editing means 11 and the number of arguments of those instructions and to store this value in a register.

This value constitutes a first signature SIG1 conforming to the present invention.

The calculation and storage means 12 are also adapted to store the operation code of a critical instruction selected by the editing means 11.

They are also adapted to store the address of an instruction selected by the editing means 11, that address having been obtained by the means 14 for generating executable code during or after the generation of the executable code.

In a variant embodiment, the calculation and storage means 12 are adapted to calculate an error detector code, for example a cyclic redundancy check code or a logical combination (XOR) from the code of the instructions selected by the editing means 11.

In a variant embodiment, the register REG1 for storing the first signature SIG1 may instead be selected by the editing means 11.

Be this as it may, the processing device generates a computer program EXE able to be executed latter and associated with a register REG0 storing a signature SIG1 representative of the expected execution of the instructions selected by the editing means 11.

A microcircuit card C including a preferred embodiment of a securing device 100 of the present invention is described next with reference to FIG. 3.

The device 100 of the invention for making the microcircuit card C secure described here includes a register REG1 for storing a first signature SIG1, representative of the expected execution of a set of instructions to be secured, calculated and stored by a processing device 10 of the type described above with reference to FIG. 2.

The securing device 100 further includes means 22 for calculating and storing in a second storage register REG2, during the execution of the set of instructions, a second signature SIG2 representative of the execution of the instructions.

In a preferred embodiment, the calculation and storage means 22 are adapted to count the number of instructions of the set of instructions that have been executed or that have not yet been executed, by comparison with the signature SIG1.

The calculation and storage means 22 preferably include means for triggering an interrupt of the computer program EXE when the value of the second signature SIG2 is below a predetermined threshold.

These interrupt triggering means are known to the person skilled in the art and are not described here.

In the example described above with reference to appendix A, the instructions of the set of instructions to be made secure are those executed when the opcode_start bit is at 1, i.e. between the execution of the instructions A2 and A12 inserted into the computer program SOURCE by the editing means 11 of the generating device 10 described with reference to FIG. 2.

Accordingly, when the processor of the securing device executes those instructions, the calculation and storage means 22 decrement the opcode_count counter in the second register REG2.

In practice, this operation is executed by the processor during the FETCH instruction.

In a second embodiment, the calculation and storage means 22 store in the register REG2 the code or the address of the last instruction executed.

This can be done as described above with reference to the instructions B7, C7 and C8 of appendices B and C, respectively.

In another embodiment, the calculation and storage means 22 calculate an error detector code from the code or an address of at least one instruction from the set of instructions.

In practice, the error detector code is calculated by the processor that executes the computer program to be made secure at the time of loading into memory instructions selected using the selection means 11 of the processing device of the invention.

In the preferred embodiment of this variant, the error detector code is a cyclic redundancy check code CRC2 or a logic combination (XOR) calculated from the codes or addresses of those instructions.

The securing device 100 of the invention also includes means 24 for detecting an anomaly in the execution of the set of instructions to be made secure.

The detection means 24 consist, for example, in a comparator for comparing the registers REG1 and REG2.

This preferred embodiment can in particular detect a difference between the signature SIG1 generated and stored by the generating device 10 of the invention and the signature SIG2 calculated and stored in the register REG2 by the calculation and storage means 22 of the securing device 100.

They can in particular detect an error in the embodiments in which the signatures consist of:
- the number of instructions in the set of instructions,
- the address of a critical instruction of the set of instructions, or
- the code of a critical instruction of that set.

In another preferred embodiment, the anomaly detection means 24 consist of a comparator adapted to compare the content of the register REG2 storing the second signature with the value 0.

This preferred embodiment is easy to implement. It can detect that all the instructions to be secured have been executed, as described above with reference to appendix A.

In a preferred embodiment, the calculation and storage means 22 are adapted to retain the second signature in the second register REG2 during execution of at least one instruction following the set of instructions to be made secure.

In this preferred variant, the second register REG2 may be, for example, a register dedicated to a volatile memory RAM of the securing device 100 this volatile memory register being overwritten by the anomaly detection means 24 after comparison of the first and second signatures.

In the preferred embodiment described here, the first signature SIG1 and the second signature SIG2 are stored in the same register REG1 of the random-access memory RAM during execution of the computer program EXE.

APPENDIX A

| A1 | mov | opcode_count, #101 |
|---|---|---|
| A2 | setb | opcode_start |
| A3 | mov | r0, #message1 |
| A4 | mov | r1, #message2 |
| A5 | mov | r2, 16 |
| | loop_round_i: | |
| A6 | mov | a,@r1 |
| A7 | xrl | a, @r0 |
| A8 | mov | @r0, a |
| A9 | inc | r0 |
| A10 | inc | r1 |
| A11 | djnz | r2, loop_round_i |
| A12 | clrb | opcode_start |
| A13 | djnz | opcode_count, error_on_opcode_count |

APPENDIX B

| B1 | XRL | A, R1 |
|---|---|---|
| B2 | JNZ | false_result |
| | correct_result: | |
| B3 | MOV | R5, SFR_OPH |
| B4 | MOV | A, R7 |

APPENDIX B-continued

| | | |
|---|---|---|
| B5 | ORL | A, #55h |
| B6 | MOV | R7, A |
| B7 | MOV | A, R5 |
| B8 | XRL | A, #70h |
| B9 | JNZ | os_kill_card |
| B10 | RET | |
| | false_result: | |
| B11 | MOV | A, R6 |
| B12 | RET | |

APPENDIX C

| | | | |
|---|---|---|---|
| C1 | 0x8500 | XRL | A, R1 |
| C2 | 0x8501 | JNZ | continue |
| C3 | 0x8503 | SJMP | secret_code |
| | continue: | | |
| C4 | 0x8505 | MOV | A, #25 |
| C5 | 0x8507 | ADD | A, #34 |
| C6 | 0x8509 | RET | |
| | secret_code: | | |
| C7 | 0x850A | MOV | A, SFR_JMPH |
| C8 | 0x850C | MOV | R5, SFR_JMPL |
| C9 | 0x850E | CJNE | A, #85h, os_kill_card |
| C10 | 0x8511 | CJNE | R5, #03h, os_kill_card |
| C11 | 0x8514 | MOV | A, PIN |
| C12 | 0x8516 | RET | |

APPENDIX D

| | | | |
|---|---|---|---|
| D1 | | setb | chk_opcode_start |
| D2 | 78 | mov | r0, #message1 |
| D3 | 79 | mov | r1, #message2 |
| D4 | 7A | mov | r2, 16 |
| loop_round_i: | | | |
| D5 | E7 | mov | a, @r1 |
| D6 | 66 | xrl | a, @r0 |
| D7 | F6 | mov | @r0, a |
| D8 | 08 | inc | r0 |
| D9 | 09 | inc | r1 |
| D10 | DA | djnz | r2, loop_round_i |
| D11 | 74 | mov | a, checksum |
| D12 | B4 | cjne | a, #0F, kill_card |

The invention claimed is:

1. A method of making secure the execution of a computer program (EXE) in a computing device comprising a microprocessor, the method comprising:
 a first step (E30), performed prior to the execution of the computer program, of calculating and storing, into a first read-only memory readable by the microprocessor, a first signature (SIG1) representative of the intended execution of a set of instructions of the computer program (EXE), said calculating being carried out according to a predetermined calculation mode;
 a second step, following said first step (E30), of executing the set of instructions of the computer program by way of the microprocessor, said second step (E50) including calculating, performed as a result of the execution of the set of instructions, a second signature (SIG2) representative of the execution of the set of instructions of the computer program, and storing said second signature (SIG2) in a writeable memory readable by said microprocessor; and
 a third step (E60) of reading the first signature (SIG1) stored in the first read-only memory and the second signature (SIG2) stored in the writeable memory for determining an existence of an anomaly in the execution of the set of instructions,
 wherein the set of instructions of the computer program (EXE) are recorded in any of the first or a second read-only memory readable by the microprocessor, and
 wherein the instructions for making the execution of the computer program (EXE) secure, compiled from source code and included in the set of instructions of the computer program (EXE) and recorded in the read-only memory to be read and executed by said microprocessor, comprise
 at least one first instruction that initializes said step (E50) of calculating and storing the second signature,
 at least one second instruction for performing the step of calculating and storing the second signature consistent with the calculation mode of the first signature,
 a third instruction, different from said at least one second instruction, that compares the second signature obtained according to the at least one second instruction with the first signature, and
 a fourth instruction that manages an execution anomaly detected in response to the comparing of the second signature with the first signature.

2. The method according to claim 1, wherein the first step (E30) is executed during the generation of the instructions (A1, A13) of the computer program.

3. The method according to claim 1, wherein the second signature (SIG2) stored during the second calculation and storage step (E50) is retained in memory during the execution of at least one second instruction following the set of instructions.

4. The method according to claim 1, wherein:
 the first signature (SIG1) is obtained from the number of instructions in the set of instructions,
 the second signature (SIG2) is obtained from the number of instructions from the set of instructions that have been executed, and
 the third step (E60) detects an execution anomaly when the first signature (SIG1) and the second signature (SIG2) are different after the execution of the set of instructions.

5. The method according to claim 1, wherein:
 the first signature (SIG1) is obtained from the number of instructions in the set of instructions,
 the second signature (SIG2) is obtained from the number of instructions from the set of instructions that have not been executed, this second signature (SIG2) being calculated from the first signature (SIG1), and
 the third step (E60) detects an execution anomaly when the value of the second signature (SIG2) is not zero after the execution of the set of instructions.

6. The method according to claim 5, wherein an interrupt of the computer program is triggered when the value of the second signature (SIG2) is below a predetermined threshold.

7. The method according to claim 5, wherein the first signature (SIG1) and the second signature (SIG2) are retained in memory during the execution of the program in the same register (REG1).

8. The method according to claim 1, wherein:
 the first signature (SIG1) is obtained from the code of a critical instruction of the set of instructions,
 the second signature is obtained from the code of the critical instruction, that code being stored at the same time as or after the execution of the critical instruction, and the detection step (E60) detects an execution anomaly when the first signature (SIG1) and the second signature (SIG2) are different after the execution of the set of instructions.

9. The method according to claim 1, wherein:
the first signature (SIG1) is obtained from the address of a critical instruction of the set of instructions, the address being obtained during or after the generation of the executable code of the set of instructions,
the second signature (SIG2) is obtained from the address of the critical instruction, that address being stored (E30) at the same time as or after the execution (E30) of the critical instruction, and
the detection step (E60) detects an execution anomaly when the first signature (SIG1) and the second signature (SIG2) are different after the execution of the set of instructions.

10. The method according to claim 1, wherein:
the first signature (SIG1) and the second signature (SIG2) are error detector codes (CRC1, CRC2) calculated from the code or from an address of an instruction of the set of instructions, and
the third step (E60) detects an execution anomaly when the first signature (SIG1) and the second signature (SIG2) are different after the execution of the set of instructions.

11. The method according to claim 10, wherein the error detector codes (CRC1, CRC2) are cyclic redundancy check codes.

12. The method according to claim 10, wherein the error detector codes are obtained by the logical combination (XOR) of the code or an address of at least one instruction of the set of instructions.

13. The method according to claim 1, wherein:
the first signature (SIG1) and the second signature (SIG2) are respectively obtained during the generation and the execution of the instructions from at least two elements chosen from:
the number of instructions in the set of instructions,
the code of at least one instruction of the set of instructions,
the address of at least one instruction of the set of instructions, and
an error detector code calculated from the code or an address of at least one critical instruction of the set of instructions, the address being obtained during or after the generation of the executable code of the set of instructions, and
the third step (E60) detects an execution anomaly when the first signature (SIG1) and the second signature (SIG2) are different after the execution of the set of instructions.

14. The method according to claim 1, further comprising:
a step (E70) of destroying at least a portion of the system on which the computer program is executed, this step of destroying being made when an execution anomaly is detected in the third step.

15. The method according to claim 1, wherein the first signature (SIG1) is generated automatically (E30).

16. The method according to claim 1, wherein the third and fourth instructions are combined as a single, same instruction.

17. A computing device, comprising:
a microprocessor for processing a computer program;
a writeable memory that is readable and writeable by the microprocessor; and
a read-only memory having stored therein said computer program, said computer program including a set of instructions that include instructions for making the execution of the computer program secure, and a first signature (SIG1) representative of an intended execution of the set of instructions prior to the execution thereof, said first signature (SIG1) having been calculated according to a predetermined calculation mode,
wherein the instructions for making the execution of the computer program secure, compiled from source code and included in said set of instructions of the computer program and recorded in the read-only memory to be read and executed by said microprocessor comprises
at least one first instruction that causes the microprocessor to calculate a second signature using a calculation mode corresponding to the calculation mode of the first signature,
at least one second instruction that stores the second signature in the writeable memory,
a third instruction, different from the at least one second instruction, that compares the second signature obtained according to the at least one second instruction with the first signature for detecting an execution anomaly, and
a fourth instruction that manages the execution anomaly detected in response to the comparing of the second signature with the first signature.

18. The computing device according to claim 17, wherein the first signature (SIG1) is calculated from the number of instructions of the set of instructions.

19. The computing device according to claim 17, wherein the first signature (SIG1) is calculated from the code of a critical instruction of the set of instructions.

20. The computing device according to claim 1, wherein the first signature (SIG1) is calculated by obtaining and storing information from the address of a critical instruction, the information being obtained by the instructions for generating executable code from the source code.

21. The computing device according to claim 17, wherein the first signature (SIG1) is calculated from an error detector code (CRC1) calculated from the code or an address of at least one instruction of the set of instructions.

22. The computing device according to claim 21, wherein the error detector code (CRC1) is a cyclic redundancy check code.

23. The computing device according to claim 21, wherein the error detector code is obtained by a logical combination (XOR) of the code or an address of at least one instruction of the set of instructions.

24. The computing device according to claim 17, wherein the third and fourth instructions are combined as a single, same instruction.

25. A computing device, comprising:
a microprocessor;
a memory, having stored therein a computer program including a set of instructions that include instructions for making the execution of the computer program secure;
a first register (REG1), which is read-only to the microprocessor, for storing a first signature (SIG1) representative of the intended execution of the set of instructions, said first signature being the result of a calculation carried out according to a predetermined calculation mode; and
a second register (REG2) for storing a second signature (SIG2),
wherein the computer program, upon execution by the microprocessor, causes the microprocessor to
calculate and store in the second storage register (REG2) during the execution of the set of instructions a second signature (SIG2) representative of the execution of the set of instructions; and read the first signature (SIG1) and the second signature (SIG2) to detect an anomaly in the execution of the set of instructions, wherein the instructions for making the execution of the computer program secure, compiled from source code and included in said set of instructions of the computer program and recorded in a read-only memory to be read and executed by said microprocessor comprise at least one first instruction that initializes the calculation and storage of the first signature, at least one second instruction for performing the step of calculating and storing the second signature consistent with the calculation mode of the second signature, a third instruction, different from the at least one second instruction, that compares the second signature obtained according to the at least one second instruction with the first signature, and a fourth instruction that manages an execution anomaly detected in response to the comparing of the second signature with the first signature.

26. The computing device according to claim 25, wherein the second signature (SIG2) is retained in the second register (REG2) during the execution of at least one second instruction following the set of instructions.

27. The computing device according to claim 25,
wherein the first signature (SIG1) is obtained from the number of instructions of the set of instructions,
wherein the second signature (SIG2) is obtained from the number of instructions of the set of instructions that have been executed, and
wherein an execution anomaly is detected when the first signature (SIG1) and the second signature (SIG2) are different after the execution of the set of instructions.

28. The computing device according to claim 25,
wherein the first signature (SIG1) is obtained from the number of instructions of the set of instructions,
wherein the second signature (SIG2) is obtained from the number of instructions of the set of instructions that have not been executed, said second signature (SIG2) being calculated from the first signature (SIG1), and
wherein an execution anomaly is detected when the value of second signature (SIG2) is not zero after the execution of the set of instructions.

29. The computing device according to claim 28, wherein the computer program causes an interrupt in the execution of the computer program when the value of the second signature (SIG2) is below a predetermined threshold.

30. The computing device according to claim 25,
wherein the first signature (SIG1) is obtained from the code of a critical instruction of the set of instructions,
wherein the second signature (SIG2) is obtained from the code of the critical instruction, the code being stored at the same time as or after the execution of the critical instruction, and
wherein an execution anomaly is detected when the first signature (SIG1) and the second signature (SIG2) are different after the execution of the set of instructions.

31. The computing device according to claim 25,
wherein the first signature (SIG1) is obtained from the address of a critical instruction of the set of instructions,
wherein the second signature (SIG2) is obtained from the address of the critical instruction, said address being stored at the same time as or after the execution of the critical instruction, and
wherein an execution anomaly is detected when the first and second signatures are different after the execution of the set of instructions.

32. The computing device according to claim 25,
wherein the first signature (SIG1) and the second signature (SIG2) are error detector codes (CRC1, CRC2) calculated from the code of an instruction of the set of instructions, and
wherein an execution anomaly is detected when the first signature (SIG1) and the second signature (SIG2) are different after the execution of the set of instructions.

33. The computing device according to claim 32, wherein the error detector codes (CRC1, CRC2) are cyclic redundancy check codes.

34. The computing device according to claim 32, wherein the error detector codes are obtained by a logical combination (XOR) of the code or an address of at least one instruction of the set of instructions.

35. The computing device according to claim 25,
wherein the first signature (SIG1) is obtained from at least two elements chosen from:
the number of instructions of the set of instructions,
the code of at least one instruction of the set of instructions,
the address of at least one instruction of the set of instructions, and
an error detector code calculated from the code or the address of at least one instruction of the set of instructions,
wherein the second signature (SIG2) is obtained in a similar manner from the at least two elements during the execution of the instructions, and
wherein the an execution anomaly is detected when the first signature (SIG1) and the second signature (SIG2) are different after the execution of the set of instructions.

36. The computing device according to claim 33, further comprising:
means for destroying at least a portion of the computer program.

37. A microcircuit card, comprising a securing device (100) according to claim 25.

38. The computing device according to claim 25, wherein the third and fourth instructions are combined as a single, same instruction.

* * * * *